(12) United States Patent
Buzza (10) Patent No.: US 11,266,903 B2
(45) Date of Patent: Mar. 8, 2022

(54) ELECTRONIC CARD READING SYSTEM

(71) Applicant: Nathan Buzza, Pompano Beach, FL (US)

(72) Inventor: Nathan Buzza, Pompano Beach, FL (US)

(*) Notice: Subject to any disclaimer, the term of this patent is extended or adjusted under 35 U.S.C. 154(b) by 213 days.

(21) Appl. No.: 15/990,849

(22) Filed: May 29, 2018

(65) Prior Publication Data

US 2019/0366197 A1    Dec. 5, 2019

(51) Int. Cl.
   *A63F 9/24*      (2006.01)
   *A63F 1/06*      (2006.01)
   *A63F 1/02*      (2006.01)
   *G06F 3/0487*    (2013.01)

(52) U.S. Cl.
   CPC .......... *A63F 1/06* (2013.01); *A63F 1/02* (2013.01); *A63F 9/24* (2013.01); *G06F 3/0487* (2013.01); *A63F 2009/242* (2013.01); *A63F 2009/2425* (2013.01); *A63F 2009/2435* (2013.01)

(58) Field of Classification Search
   CPC ................................. A63F 9/24; G07F 17/00
   See application file for complete search history.

(56) References Cited

U.S. PATENT DOCUMENTS

| | | | |
|---|---|---|---|
| 5,169,155 A * | 12/1992 | Soules | A63F 1/02 156/277 |
| 6,527,191 B1 | 3/2003 | Jannersten | |
| 8,150,158 B2 | 4/2012 | Downs | |
| 8,272,945 B2 * | 9/2012 | Kelly et al. | A63F 9/24 463/25 |
| 8,969,802 B1 * | 3/2015 | Blazevic | A63F 1/12 250/330 |
| 2006/0066564 A1 | 3/2006 | Yee | |
| 2007/0069462 A1 * | 3/2007 | Downs, III | A63F 1/12 273/149 R |
| 2011/0300917 A1 * | 12/2011 | Hill | A63F 9/24 463/11 |
| 2015/0087371 A1 * | 3/2015 | Hill | G07F 17/3293 463/11 |
| 2015/0115529 A1 | 4/2015 | Chin | |

FOREIGN PATENT DOCUMENTS

WO     2015021272 A1    2/2015

* cited by examiner

*Primary Examiner* — Sunit Pandya (57) ABSTRACT

The present invention provides an electronic playing card reading device, a system and method thereof for scanning and reading playing cards in a deck. The device recognizes sequence of every card in a deck by scanning a unique barcode which is inscribed on each playing card. The barcode represents characteristics of the playing cards, including value, suit, color, orientation, and the like. The device uses an IR camera to scan the barcodes of the playing cards; uses a processor to analyze and decode the encoded information in the barcodes and determine the characteristics of the playing cards. This further determines the sequence of the playing cards in the deck. Hence, the card reading device allows a performer a myriad of magic tricks. Also, the device communicates with a user device installed with a scanning application that executes instructions to control the device for scanning and perform various effects.

16 Claims, 11 Drawing Sheets

*Preamble*

| Bit | Binary | Decimal | Image |
|---|---|---|---|
| Start | 0000 | 0 | |
| Stop | 1111 | 15 | |

*Suits*

| Suit | Binary | Decimal | Image |
|---|---|---|---|
| Clubs | 00 | 0 | |
| Hearts | 01 | 1 | |
| Spades | 10 | 2 | |
| Diamond | 11 | 3 | |

FIG. 4B → 400B

*Cards*

| Card | Binary | Decimal | Image |
|---|---|---|---|
| Ace | 0001 | 1 | |
| Two | 0010 | 2 | |
| Three | 0011 | 3 | |
| Four | 0100 | 4 | |
| Five | 0101 | 5 | |
| Six | 0110 | 6 | |
| Seven | 0111 | 7 | |
| Eight | 1000 | 8 | |
| Nine | 1001 | 9 | |
| Ten | 1010 | 10 | |
| Jack | 1011 | 11 | |
| Queen | 1100 | 12 | |
| King | 1101 | 13 | |
| Joker | 1110 | 14 | |

FIG. 4C → 400C

*Deck Colour*

| Bit | Binary | Decimal | Image |
|---|---|---|---|
| Red Deck | 0 | 0 | ▫ |
| Blue Deck | 1 | 1 | ▪ |

FIG. 4D → 400D

*Even Parity*

| Bit | Binary | Decimal | Image |
|---|---|---|---|
| Parity Bit 0 | 0 | 0 | ▫ |
| Parity Bit 0 | 1 | 1 | ▪ |

ELECTRONIC CARD READING SYSTEM

FIELD OF INVENTION

The present invention generally relates to an electronic device for scanning and identifying multiple playing cards for magicians. More particularly, the present invention relates to an electronic card reading device and system for recognizing the sequence of every card in a stack of playing cards by scanning a unique Infrared bar code which is inscribed on each playing card.

BACKGROUND

Even with the substantial advancements in electronics that have occurred within the gaming industry, playing cards and other physical gaming objects remain important implements within gaming venues. In the gaming industry, more and more technology is being used to combine traditional physical gaming elements (such as playing cards) with electronic systems. Performers/magicians have accepted the electronic systems and are aware that physical event outcomes can also be electronically determined (read and analyzed). Of all the systems, the combination of electronic systems with playing card magic tricks has proven to be the most difficult, as the cards may vary in readability during the game (face-up versus face-down) and the images on the playing cards vary between decks, additionally the extreme thinness of the playing cards prevent electronics from being inserted into the playing cards, with the noticeable exception of passive RFID Technology. Many attempts have been made to effectively and accurately read playing cards during betting games.

It is known to provide playing cards with a machine-readable code, so as to enable the various cards to be distinguished from each other and mutually identified. Also known to the art are devices that register cards taken from a pack and dealt to a player; as are also devices which divide a pack into four predetermined hands and the cards scanned mechanically and divided into four piles on the basis of the scan.

Further, most of the present methodologies to detect cards in a deck rely upon reading the face or back of the playing cards. This approach, however, requires the cards to be present sequentially by a card reader, so that each card may be read. Further, these methods fail to determine the value and suit of the cards from a stacked deck of playing cards, and only the top card whose front or back is exposed can be read. Additionally, the sequence of the playing cards cannot be determined. Furthermore, such methods fail to disclose reading the sequence, value, suit, color or any other characteristics of the playing cards from a remote location, since the playing cards need to be put into a reading machine. None of the methods disclose identifying card orientation, card direction and card color.

A secondary method exists utilising specially manufactured playing cards that contain a passive RFID Tag, that allow a small number (1-3) of Playing Cards to be simultaneously, however this method cannot report the order (sequence) of the Playing Cards. This method is limited to the number of Playing Cards that can be read (it is not possible to read every card within the deck).

The existing technologies generally disclose methods that include cards to be placed into a reading machine for processing and hence, are not designed to be operated 'in the open'. This feature does not allow the magicians/performers to perform those magic tricks that may be done in the open. Therefore, this poses a restriction to the magicians/performers.

Further, many of the present systems surround around an idea of identifying those cards that are marked by the players only; hence, to provide a detection system for identifying cards that could be used for cheating.

Therefore, there exists a need to design and develop an electronic card reading device and system which is able to scan and identify the characteristics of the playing cards even when the cards are stacked in a deck. Further, there is a need for an innovative electronic card reading device which is able to determine the characteristics of the playing cards even from a remote location, and also communicate with a web/mobile application.

SUMMARY

The present invention seeks to provide a solution to the above problems by providing an electronic card reading device and system that assists performers/magicians in performing multiple and variable tricks using playing cards. A method of reading one or more characteristics of the playing cards including and not limiting to suit, color, value, direction and orientation is enabled on a device and a system thereof.

This problem is solved by the present invention, where playing cards are encoded with a simple code on one hand and inexpensive card reading devices are used on the other hand. The code inscribed on the cards can be easily read with great reliability by means of inexpensive equipment.

It is an objective of the present invention to design and develop an inexpensive electronic card reading device which is able to scan and identify various characteristics of the playing cards and also data information about a deck of playing cards, whether the deck is stacked or spread.

It is further an objective of the present invention that the electronic card reading system is also able to identify orientation, direction and color of the playing cards.

It is also an objective of the present invention to provide the electronic card reading system which is able to determine the playing cards from a remote location also, and is not just restricted to a card reader.

It is further an objective of the present invention to scan the playing cards from any position of the cards, whether the cards are stacked, spread or riffled, or faced-up or faced-down.

The foregoing and other objects, features and advantages of the invention will be apparent from the following more particular descriptions of exemplary embodiments of the invention.

DETAILED DESCRIPTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather to provide an understandable description of the invention.

This patent describes the subject matter for patenting with specificity to meet statutory requirements. However, the description itself is not intended to limit the scope of this patent. The principles described herein may be embodied in many different forms.

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention provides an electronic card reading device, system and method thereof. The electronic card reading system is a scanning system suitable for determining one or more desired characteristics of playing cards being scanned. The system includes one or more Infrared (also abbreviated as IR) sensitive cameras positioned to scan and read uniquely encoded information printed on the playing cards and transmit this encoded information to a processor. The encoded information contains various characteristics of the playing cards. The characteristics of the playing cards may include and are not restricted to suit, color, value, orientation, direction, sequence and order of each playing card in a deck. The processor is configured to decode the encoded information and provide information regarding the sequence of the cards in the deck, with various characteristics of the playing card to a user through a short-range communication channel. The user may be a performer or a magician.

Further, the encoded information may be inscribed on one or other different areas of the playing cards, such as including and not restricting to four edges of the cards, faces of the cards, or on rear of the cards. Hence, the IR sensitive camera of the system is able to scan and read the playing cards using three scanning methods, including scanning the edges of the cards; scanning the faces of the cards; and scanning the rears of the cards. Since, in the present card reading system, the playing cards are marked with the encoded information on the edges of the cards, therefore, the camera is able to scan and read the encoded information on all the playing cards even when they are stacked in a deck. Hence, not only the top card placed in the stacked deck is scanned and read, but all the other cards stacked below the top card are also scanned and read. Therefore, in addition to scan a spread deck of playing cards, the system is able to scan a stacked deck of playing cards.

The system, hence, allows performing a myriad of card tricks by scanning a set of playing cards from one or any direction, and also while whether the playing cards are settled in a stack, or spread, or riffled.

Figure 1:
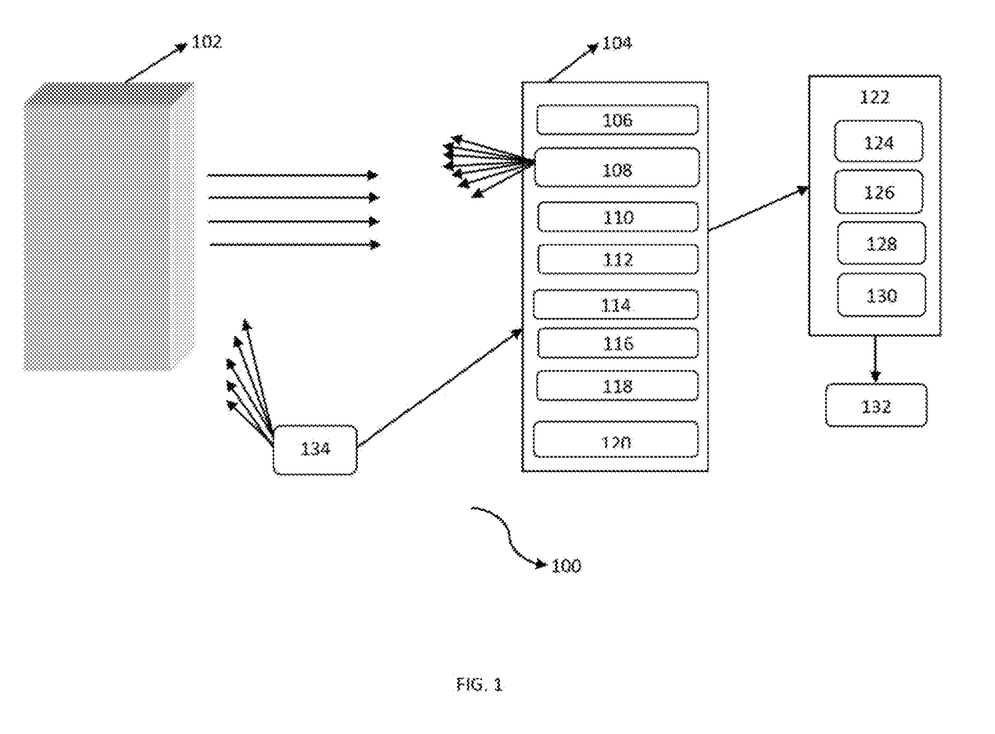
FIG. 1 illustrates an electronic card reading system for scanning and identifying playing cards, in accordance with an embodiment of the present invention.

FIG. 1 illustrates an electronic card reading system for scanning and identifying playing cards, in accordance with an embodiment of the present invention. The card reading system 100 includes a plurality (or a deck) of playing cards 102 with a unique encoded information inscribed on each one of them; and a card reading device, also referred to as a card reader 104. The card reader 104 further comprises a central processing unit (CPU) 106 for executing a card scanning algorithm; one or more inbuilt cameras 108; a communicating module 110; a programming module 112; one or more battery 114; externally accessible micro-switch 116; and onboard LEDs 118 to indicate various operating functions. In an embodiment, the card reader may also comprise a proximity sensor 120. The card reader 104 is housed in a 3D printed case that fits within a standard size card case (shown in further figure).

The encoded information inscribed on the edge of the playing cards may be in the form of barcodes or QR codes or any other two-dimensional code which is machine-readable and contains encoded information about the characteristics of the playing cards. Hereinafter, the encoded information and barcodes may be used inter exchangeably throughout the description of the invention without deviating from the meaning and scope of the present invention. Further, the barcodes are inscribed using an IR radiation absorbent ink, where the IR is the one which is visible using the inbuilt camera 108 of the card reader and invisible to the human eye. Furthermore, the unique barcodes may be inscribed on different areas of playing cards, such as including and not restricted to the four edges of each playing card, face of the playing cards or on the rear of the playing cards. The unique barcodes contain information about various characteristics of the playing cards, where the characteristics include and are not restricted to suit, value, color, orientation and direction (face-up or face-down) of each card.

The inbuilt camera 108 of the card reader 104 works in an Infrared (IR) with longer wavelengths than those of visible light, and is therefore invisible to the human eye. Preferably, the inbuilt camera 108 may be an Infrared (also abbreviated as IR) camera. So, the barcodes are inscribed using IR absorbent ink. The application of such camera 108 is to take advantage of the longer wavelength of IR to hide the light from the human eye. Further, the inbuilt camera 108 is a high-quality camera that is capable of streaming high quality video to the CPU 106 for bar code and image analysis. Therefore, the inbuilt IR camera 108 of the card reader 104 scans the playing cards 102 (similar in function to a bar code scanner), and while scanning the playing cards the camera 108 captures either the images or a video of the barcodes inscribed on the playing cards 102. Thereafter, the camera 102 sends these images or videos to the CPU 106 for further processing.

The Central Processing Unit 106 is responsible for accepting the video feed from the inbuilt camera 108. The video feed contains the infrared images of the barcodes which are inscribed on the playing cards. Once the video feed is obtained, the CPU 106 decodes the bar code sequence, analyses it and determines a desired result using the scanning algorithm. The result may include determining the sequence and order of the playing cards in a stack or a deck 102; determining position of a particular card, determining a card at a particular position, determining/locating missing cards; and other desirable results.

Further, the inbuilt camera may 108 scan the playing cards in either of two ways: scanning the edge of the playing cards; or scanning the face/rear of the playing cards. In order to scan the edge of a playing card, each playing card must be treated with an IR absorbent ink, so that when an IR LED illuminates the card, then the edge of the card reveals. While, in order to scan the face/rear of the playing cards, the cards contain the similar barcodes and are marked on their borders, hence scanning may occur on both the side of the card and of the face/rear of the card. However, it may be understood that for scanning the face/rear of the cards, the deck of cards need to be spread. The scanning methods are described in details in conjunction with further figures.

The communicating module 110 of the card reader 104 provides communication between the card reader 104 and a desired user device 122. The communicating module may be a short range communicating module, such as a Bluetooth device. It enables transmitting the result of the scanning to the user device 122 via which the results are in turn transmitted to the user. Further, the communicating module 110 may also allow several other functions such as including indicating or providing a feedback to the user device 122 that the card reader 104 is functioning properly; reporting battery status to the user device 122; reporting version of software and need of upgrade of software of the card reader 104; downloading a new version of the software and upgrade the new version from the user device 122 only, without the need for external programming equipment; and communicating videos and images to the user device 122.

Further, the programming module 112 is responsible for downloading or upgrading new software to the card reader 104 in case the Bluetooth connection has failed. Additionally, the programming module 112 also provides a provision to charge the card reader 104. In a preferred embodiment, the programming module 112 is a USB programming module.

The card reader 104 has one or more batteries 114 to provide power to it. The card reader 104 preferably needs to operate for a minimum of four hours, to allow for the maximum performance time of a performer. Further, the card reader 104 has an externally accessible micro-switch 116 switches the card reader 104 Power On/Off; one micro-switch button for the user to configure the card reader 104 on the side for a calibrate function and three micro-switch buttons on the top for the user to configurable the card reader 104 to perform a desired effect/result. Furthermore, the card reader 104 has onboard LEDs 118 to indicate various operating functions, such as to indicate Power; to indicate power of communicating module 110; and to indicate power/functioning of a remote Camera.

The card reading system 100 reads the printed or embedded information onto the playing cards 102 placed in the area of vision of the camera 108. A preferred scanning system employs a unique IR camera 108 which transmits an output signal containing the encoded bar code information to the central processing unit 106. The CPU 106 accepts the video feed from the onboard IR video cameras 108; decodes the bar code sequence and forward the results to a paired user device 122. The pairing of the user device 122 with the card reader 104 is done via the communicating module 110 of the card reader 104 with the communicating module 124 of the user device 122. In an embodiment, the user device 122 is a mobile device. A preferred embodiment of the card reading system 100 may have an i-phone as the user device 122. The inbuilt camera 108 is an auto-focus B&W IR camera 108 for bar code detection. After capturing images/videos of the barcodes of the playing cards 102, the card scanning algorithm installed in the card reader 104 applied multiple scanning techniques to decode the barcodes and determine characteristics of the playing cards and the sequence of every card in the deck 102.

Preferably, the data read from the playing cards is passed to CPU 106, which decodes and identifies the cards value based on the data received from the IR camera 108. This identification may involve processing an image from an infrared camera and/or performing some form of mapping or lookup based on a barcode value. The central processing unit 106 generates a graphic based on the value of the playing card. This graphic may, for example, comprise text information, some form of image, some form of animation, or any combination of such elements as appropriate. The graphic is then incorporated into a broadcast signal and sent to the user device 122.

The card scanning and encoding algorithm executed by the CPU 106 plays the most crucial part while the magic trick or any other performance is being performed. The card scanning algorithm is intelligent enough to associate a probability of a correct card read for each play and furthermore make an estimate of the likely value of a card, which had a poor read. Further, the scanning algorithm identifies and intelligently sequences the playing cards by calculating the most accurate deck order through multiple techniques. The scanning algorithm is calibrated for the following assumptions: (a) existence of 52 cards in a deck (b) existence of 4 cards of each number (c) 13 cards of each suite (d) no repetitive/duplicate cards.

In addition to the bar code image processing, the card reader 104 executes intelligent scanning algorithms employing multiple techniques to determine the deck 102 order, and to perform various technical functions including, but are not limited to the following: scanning the deck multiple times and correlate the results of the scan to determine the order of the cards in the deck; if the algorithm can determine the suit of the card, but is unable to determine the number of the card, then the algorithm will review which numbers of the particular suit it is missing and calculate its best estimate for the likelihood of the undetermined card. As example of this would be if the algorithm identifies all of the clubs, with the exception of the 10 of clubs and it detects a card that is a club but enable to read the number, then it would be safe to assume that the missing card is the 10 of clubs. This also holds true, if the algorithm can determine the number of the card, but is unable to determine the suit of the card.

In another embodiment, the scanning algorithm can be used to perform any one or combination of the following functions: Read all playing cards; Locate missing cards; Locate inserted cards; Locate rotated cards; Locate upside-down cards; Count cards; Name any card; and Locate any card at any number. It may be appreciated by a person skilled in the art that the scanning algorithm may also perform other type of the functions including the above mentioned, without deviating from the meaning and scope of the present invention.

Further, the result/analysis of the scanning algorithm is communicated to the user device 122, which may be further communicated or announced to the user via an earpiece 132. The earpiece 132 may be a Bluetooth earpiece connected with the communicating module 124 of the user device 122. Therefore, the electronic card reading system 100 scans the barcodes on the playing cards using the IR cameras 108; processes the captured images/videos of the barcodes using the CPU 106; decodes the information contained in the barcodes and determines the sequence of the playing cards and other characteristics of the playing cards using the scanning algorithm by the CPU 106; sends the result to the user earpiece 132 via a user device 122. In an embodiment, instead of the earpiece 132, a compact output device 132 with a display panel and direct connectivity with the card reader 104 via the communicating module 110 may also be used. The output device 110 is connected over a short range communication protocol with the card reader 104. In this case, the user device 122 may be omitted, and the output device 132 may be directly connected with the card reader 104. In another embodiment, the earpiece 132 may be directly connected with the card reader 104 over a short range communication protocol, without the user device 122.

The position of the IR cameras 108 plays an important role and may contribute to the success and precision of the performance. The camera 108 may potentially be located in the box/case of the playing cards. In an embodiment of the present invention, the card reading system 100 may also include an additional wireless camera 134 transmitting an analogue video stream, and potentially located on the performer's jacket or in the performer's sleeve. In this case, the CPU 106 receives scanned images/videos from both the inbuilt camera 108 and the wireless camera 134.

According to another embodiment of the present invention, the card reading system 100 includes a plurality of playing cards in a stack or a deck 102; a card reader 104 and a user device 122 which is a mobile device. In this embodiment, instead of the inbuilt camera 108 of the card reader 104, an inbuilt R camera 126 of the mobile device 122 is potentially utilized for scanning the barcodes and to supplement the inbuilt camera 108 of the card reader 104. Further in this embodiment, the mobile device 122 has an input/output (I/O) module 128 and a scanning to application 130 installed on it. The I/O device 128 allows the user to input choices of desired results and control and configure the scanning application 130. The application 130 decodes and analysis the images/videos received from the camera 126.

The I/O module 128 may be a keyboard, or a touch panel or a microphone to enter inputs from the user; and a display screen or a speaker to output results to the user. The user or the performer utilizes the scanning application 130 to configure the card reader 104 and then receive the feedback via the connected Bluetooth earpiece 132. However, the stage performers may discreetly hide the user device 122 into podiums, books and other objects to allow them to "peek" at the results. Additionally, angle sensitive privacy film may be utilized on the I/O device (display screen) 128, so that the screen appears black from the spectator's angle, where the performer can see the results from their angle. The user is required to register the user device 122 with a cloud server. The registration and authentication are required to activate the application 130 and the connected card reader 104 and to prevent piracy and counterfeiting of the card reading system 100. A unique ID/user name is assigned to each other after registration. The user interface and the functionality of the scanning application 130 are explained later in conjunction with further figures.

Generally, a wireless communication protocol is being employed between the CPU 106 and the user device 122 programmed application 130. The wireless communication protocol is not only limited to Bluetooth, it may generally employ any short-range communication protocol such as Wifi or cellular data transfer protocols such as GSM, CDMA et al.

According to another embodiment of the present invention, a remote user device is communicating with the card reader 104 over a long range communication protocol, such as Internet. The remote user device has a web application running on it for decoding and analyzing the barcodes and provides the results in a similar manner as the user device 122 with the scanning algorithm 130 does. The images/videos captured by the IR camera 108 of the card reader 104 are transmitted to the remote user device over the Internet (or any other wired or wireless communication). The remote user device receives the images, executes the web application over the images and provides a desired result to the performer.

The scanning algorithm 130 of the user device 122 and the web application of the remote user device configures and performs in the similar manner.

Figure 2:
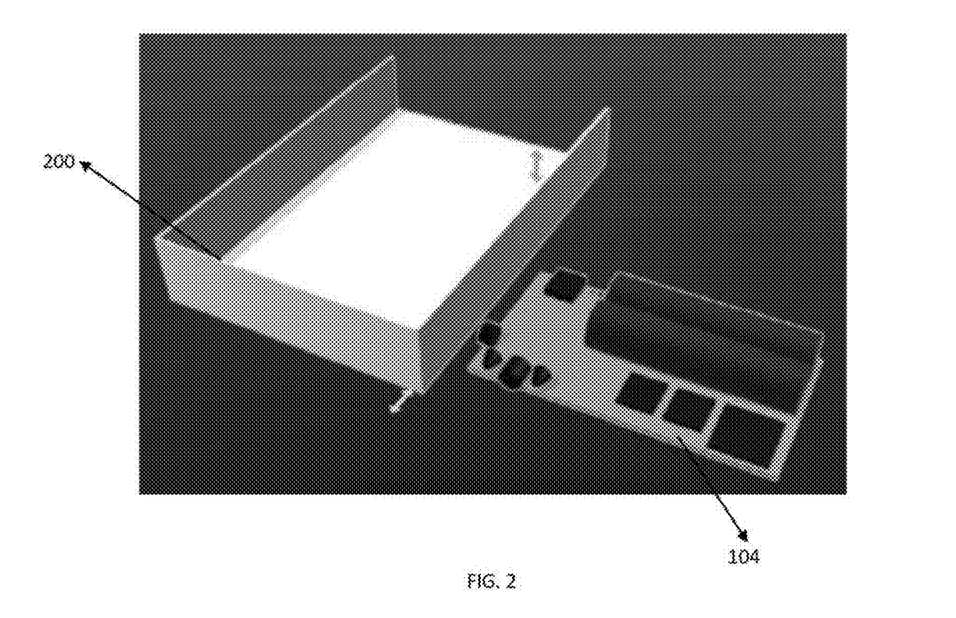
FIG. 2 illustrates a card reader housed in a playing card case, in accordance with an embodiment of the present invention.

FIG. 2 illustrates the card reader 104 housed in a playing card case 200. The case 200 may be a 3D printed case that fits within a standard size card case. Ideally, the 3D Printed enclosure would pass casual visual inspection from spectators.

Figure 3:
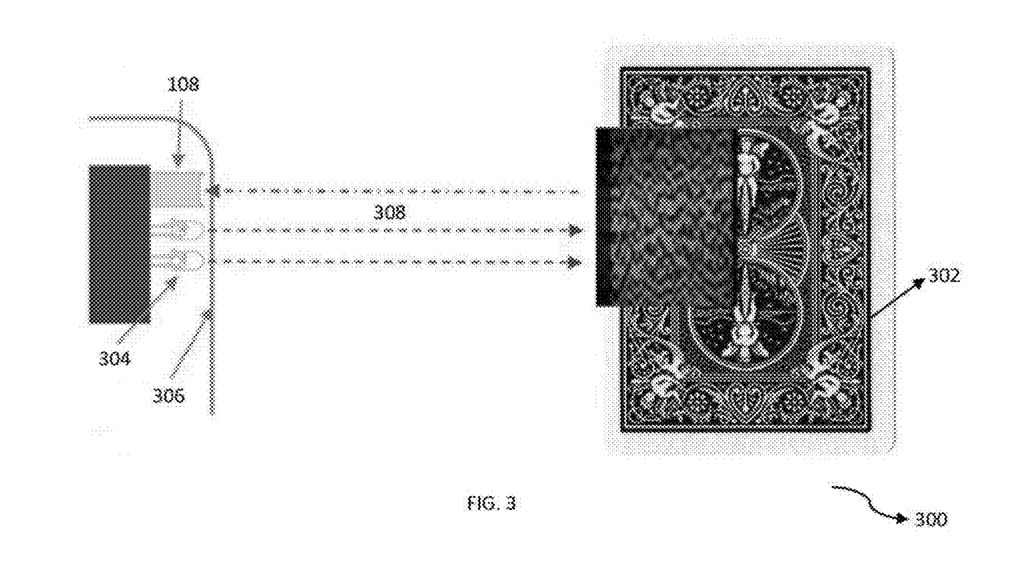
FIG. 3 illustrates a scanning method of the playing cards by scanning the edges of the playing cards in accordance with an embodiment of the present invention.

FIG. 3 illustrates a scanning method of the playing cards by scanning the edges of the playing cards, in accordance with an embodiment of the present invention. Preferably, in order to facilitate the scanning of the playing cards, each playing card is treated with an IR absorbent ink to inscribe the barcodes on them. Whenever an IR LED illuminates the card, then the embedded barcode of the absorbent ink reveals the characteristics, contained in the barcodes, of the playing card. For reading from the edges of the playing cards, the cards are generally marked on their one or more or all the four edges with a card marking system. Multiple and alternative card encoding techniques may be employed in order to achieve better accuracy and precision. The card marking system also takes into account the errors, such as forward error detection and error correction. Further, the barcodes have to be different for the cards when upside (face) down or if the card is rotated 180 degrees in the deck. This makes it possible to detect the orientation (degrees) and the direction (upside down) of the cards in the deck.

In the edge scanning method 300 shown in FIG. 3, the IR camera 108 is positioned infront of the deck such that it is able to take images/videos of the edges of the playing cards 302. One or more IR LEDs 304 illuminates the card 302, where the IR illumination is shown by numeral 306. The marked edge of the card 302 reveals its characteristics, such as suit, color, value, direction. This information further is sent to the CPU 106 for processing. The system 100 makes it possible to scan and read each and every card stacked over one another in the deck, and is not restricted to scan just the top exposed card in a stacked deck, because of the edge markings being possible in the present invention.

In an embodiment, each playing card is provided with at least one six-position binary code. Because a binary code of only six positions is sufficient to identity every card in a pack, where each barcode can be made relatively wide and where all barcodes have the same width, the code can be printed on the cards in a simple and inexpensive manner with relatively low precision requirements with respect to reliable reading of the code. Furthermore, although only one six-position binary code has been mentioned, it will be understood that the binary code can be extended if necessary to a seven-position code, an eight-position code, and so on, if necessary. It will also be understood that the position of the code on respective playing cards may be varied.

Figure 4A:
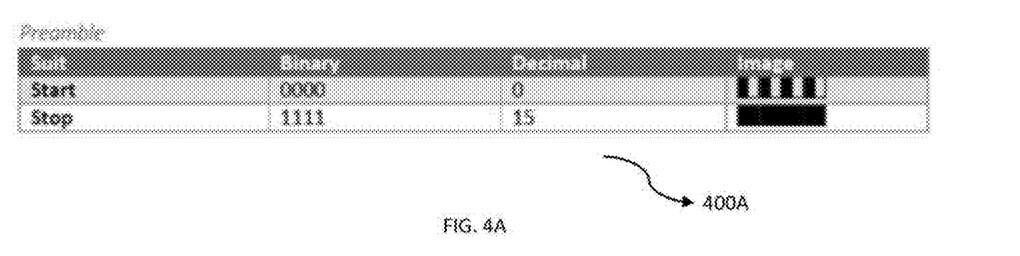
FIG. 4A-4E illustrate an example of marking the playing cards when inscribing barcodes on their edges, in accordance with an embodiment of the present invention.

FIGS. 4A-4E illustrate an example of marking the playing cards when inscribing barcodes on their edges, in accordance with an embodiment of the present invention. FIG. 4A shows marking system of a preamble 400A which signifies commencement of the coded pattern. In the example shown in FIG. 4A, four consecutive bits in sequence signifies the commencement of the coded pattern. This also identifies the orientation of the card, as an upside-down card will have a right preamble, versus a normal facing card having left preamble. Additionally, the preamble is utilized for video alignment.

Figure 4B:
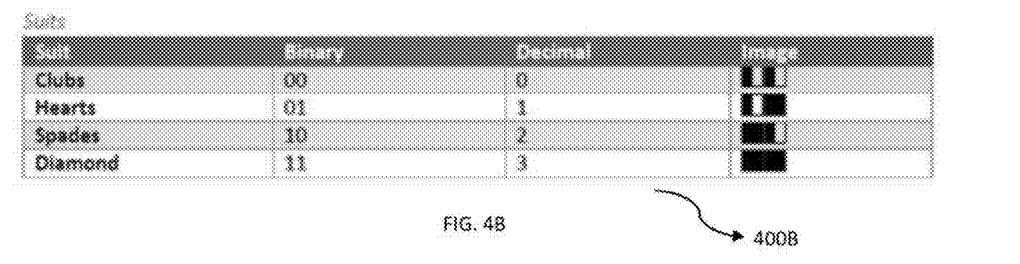
Figure 4C:
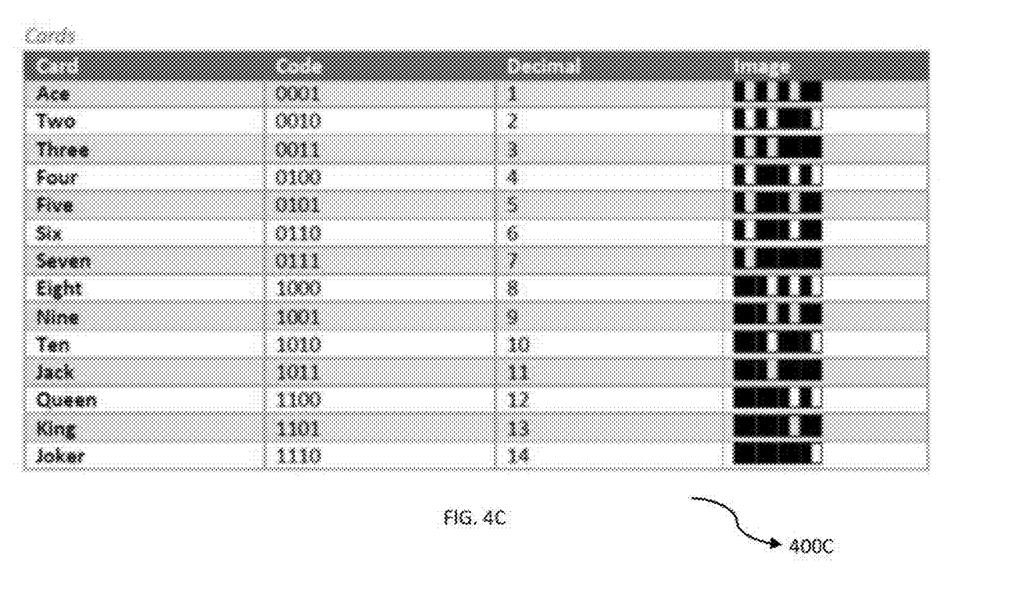
Figure 4D:
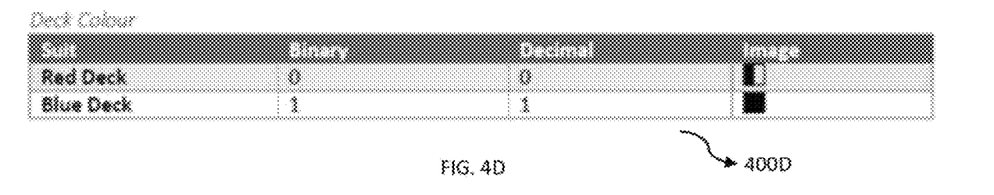
Figure 4E:
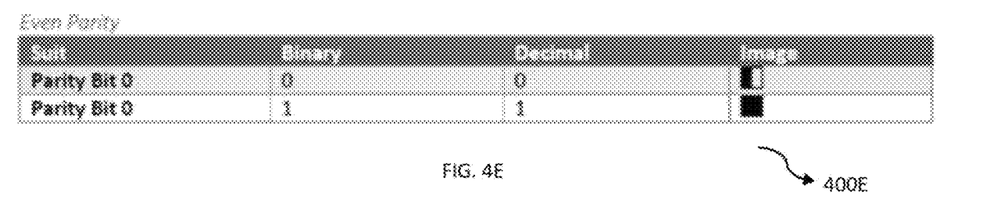

FIG. 4B shows marking system of denoting suits 400B, while FIG. 4C shows marking system for denoting cards 400C. Further, FIG. 4D shows marking system for denoting deck color (blue or red) 400D; and FIG. 4E shows marking system for denoting parity 400E.

Figure 5:
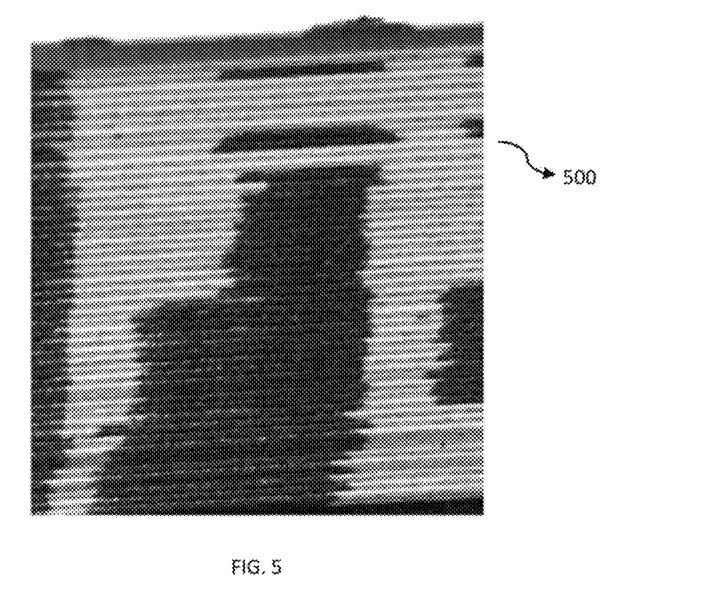
FIG. 5 illustrates a stacked deck of the marked playing cards 500 with barcodes inscribed on their edges, in accordance with an embodiment of the present invention.

FIG. 5 illustrates a stacked deck of the marked playing cards 500 with barcodes inscribed on their edges.

Further, in an embodiment, the scanning algorithm is also capable of scanning the face and rears of the playing cards. For scanning the face of the playing card, the border of the IR marked playing cards contains a similar bar coding system, Hence, the scanning may occur on both the side of the card and of the face of the card (requiring the deck to be spread).

For scanning the rear of the playing card, the border of the IR marked playing cards contains a similar bar coding system, so the scanning may occur on both the side of the card and of the rear of the card (requiring the deck to be spread).

The scanning algorithm can also scan the index of the playing cards. This requires for the magician to ribbon spread the playing cards and for the wireless camera 134 or the inbuilt camera 130 of the user device 122 to obtain a high quality image of the ribbon spread. An image recognition technique may be employed to scan the playing cards.

The scanning algorithm will need to function with the spread left-to-right, right-to-left, straight and in a semi arc and independent of background.

In a working example, one marking is inscribed on every card and at a different location for each card. Therefore, the IR camera scans the sequence of cards and sends it to the central processing unit. The processing unit decodes the value and sequences and transmits the appropriate data to the user device. A process of trial and error will be required to establish the method/technique with the highest level of accuracy.

In another embodiment, the card reading system 100 may employ RFID coded cards, a Bluetooth RFID reader and a Bluetooth thumper.

Alternatively, video recording can also be employed in order to read the sequence and all the attributes of the card. During the performance, face of each of the playing card is shown to the camera. Video recording would need to be in the order of 100 frames per second to allow for oversampling. Other alternatives for scanning the cards may include performing image recognition on the index of a spread of cards while they are faced up. The algorithm will be capable of scanning the index of the playing cards. The performer may ribbon spread the playing cards and the wireless camera can obtain high quality image of the ribbon spread.

In a live example, a spectator or a participant is asked to remove a card from a deck of IR marked playing cards. The spectator may then place the removed card in an upside down position into the deck. The card reader 104 scans the bar codes printed on the surface/edge of each playing card by the camera 108, and sends the images to the CPU 106. The scanning algorithm applies the techniques and reads the information received related to the barcodes. The reading of the barcodes reveals the sequence of the cards in the deck, while also tells which card is upside down in the deck. Hence, the card reader 104 identifies the card removed by the participant. This information is then transmitted to the magician through a paired earpiece device 132.

Figure 6A:
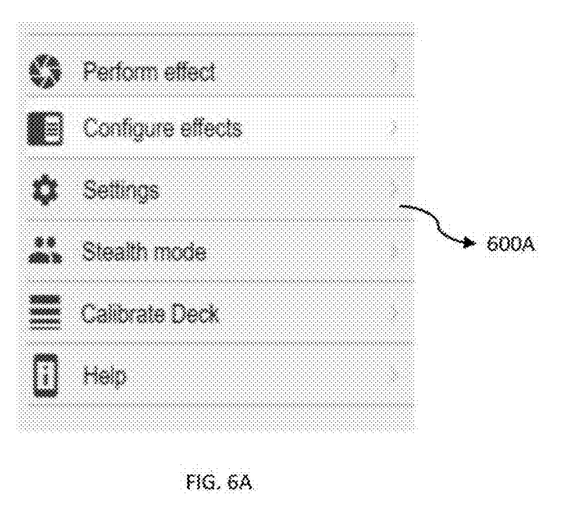
FIG. 6A-6K illustrates an exemplary user interface showing different functionalities of a scanning application, in accordance with an embodiment of the present invention.

FIG. 6A-6K illustrates exemplary user interface showing different functionalities of the scanning application, in accordance with an embodiment of the present invention. In FIG. 6A, a user interface 600A shows initial page of the scanning application 130 which allows a user to select from multiple functions, such as perform effect, configure effects, settings, stealth mode, calibrate deck, help. The user interface 600A may also include other functionalities as well, depending on the design and requirement of the application 130. By selecting 'perform effects', the user is able to instruct the card reader 104 to perform any one of the effects listed in the application 130. Effects may include and are not restricted to Read all playing cards; Locate missing cards; Locate inserted cards; Locate rotated cards; Locate upside-down cards; Count cards; Name any card; and Locate any card at any number.

Figure 6B:
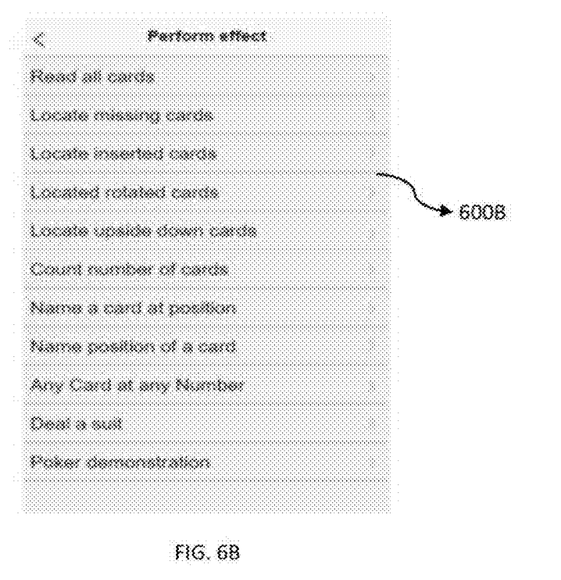

Selecting 'configure effects', the user is able to provide configuration for all the different effects. 'Settings' help the user to change different settings, such as sound, visual, or any other, of the application. FIG. 6B shows a page 600B, when the user selects the tab 'perform effects' from the page 600A. The page 600B lists all the possible effects that can be instructed by the user to be performed by the card reader 104. As mentioned above, the effects are not restricted only to the ones listed in the page 600B.

Figure 6C:
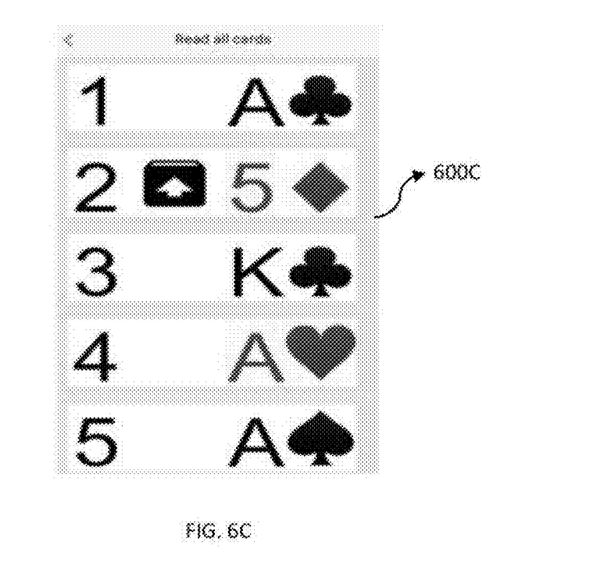
Figure 6D:
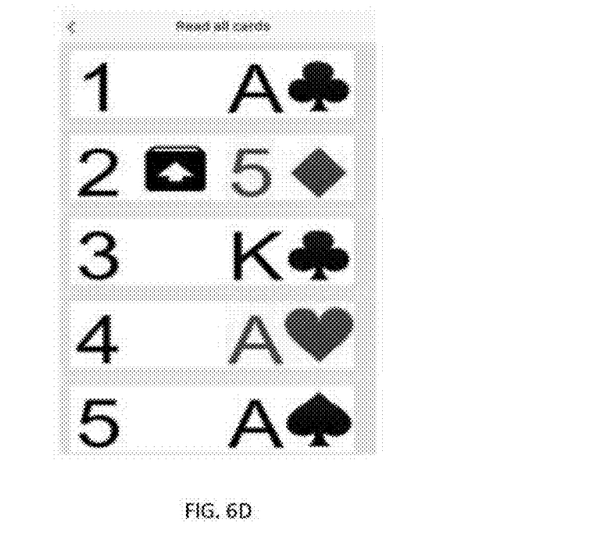
Figure 6E:
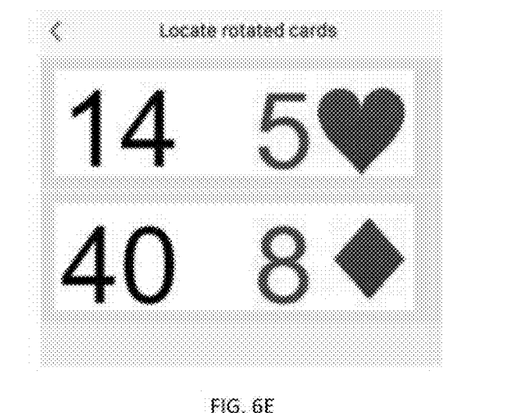
Figure 6F:
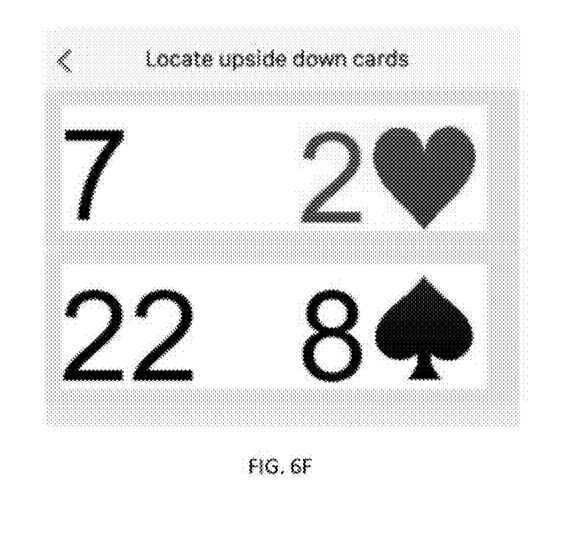

FIG. 6C shows a page 600C when the user selects the tab 'read all cards' from the page 600B. The card reader 104, hence, reads all the cards and sends the results to the display of the user device 122 in a way shown in 600C. The result displayed shows the order of the cards in which they are stacked in the deck. FIG. 6D continues the list for reading all the cards. FIG. 6E shows the cards which are rotated in the deck, when the user selects the desired tab. FIG. 6F shows the cards which are located upside down, when the user selects the desired tab from the page 600B.

Figure 6G:
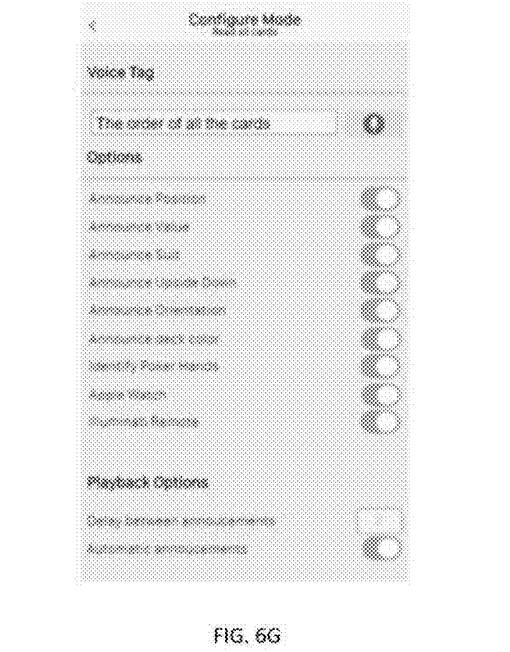
Figure 6H:
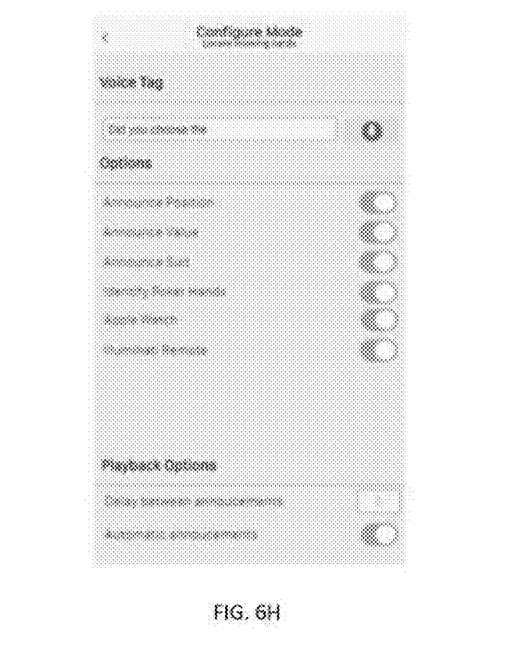

Further, the FIG. 6G shows the page in the application 130, when the user selects 'configure effects' from the page 600A. 'Configure effects' tab allows the user to configure all the effects that can be performed. Such as shown in FIG. 6G, the user may configure the effect 'read all cards'. While configuring the mode, the user may select a desired voice tag that will be announced in the earpiece 132. Further, the user may also select what all can be announced in the results of the effect 'read all cards'. Such as, the user may select/deselect to announce position, value, suit, upside down, orientation and among others. Similarly, the user may also configure other effects, such as shown in the FIG. 6H for configuring the effect 'locate missing cards'.

Figure 6I:
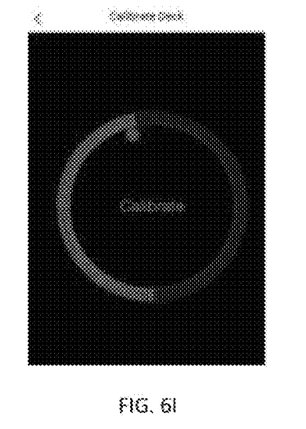
Figures 6J, 6K:
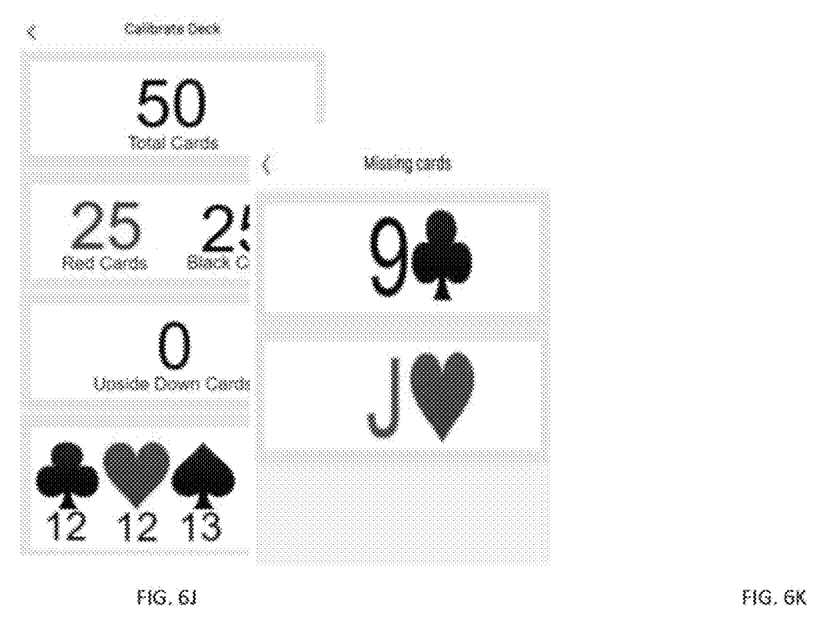

FIG. 6I shows a page from where the user may calibrate the deck. The calibration process allows the user to override the pre-determined assumption that there is a full deck of cards. By default, the algorithm assumes that there are Aces through to Kings for each of the four suits. However, under certain circumstances and for certain effects, the original state and order of the cards is required to be known. By activating the calibration process, the card reader 104 continues to scan the playing cards (multiple times) to determine the order of the deck. This process continues for a specified time period (say 30 seconds) and card reader 104 assumes that the physical deck order has not changed, so uses algorithms to determine the deck order. FIGS. 6J and 6K shows the results of the calibration, where FIG. 6J shows a total of 50 cards in a deck, total number of red cards i.e. 25, total number of blue cards i.e. 25, upside down cards i.e. 0, and total number of cards in each suit available in the deck. And, FIG. 6K shows the missing cards.

Figure 7:
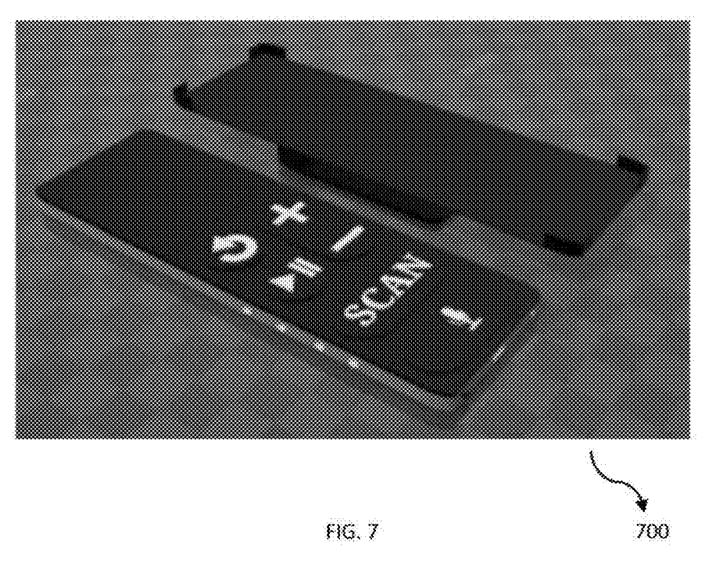
FIG. 7 shows a remote control device allowing a user to control the card reader from a distance, in accordance with an embodiment of the present invention.

FIG. 7 shows a remote control device allowing the user to control the card reader from a distance, in accordance with an embodiment of the present invention. As shown in the FIG. 7, the remote control 700 has a plurality of buttons performing different functions. The magician is able to "skip" through the cards, by pressing the "+" key and also go "backwards", by pressing the "−" key, start the scan by pressing the 'scan' button, and can provide voice instructions through the microphone button. Further, the scan can be stopped and played again using the remote control.

Figure 8:
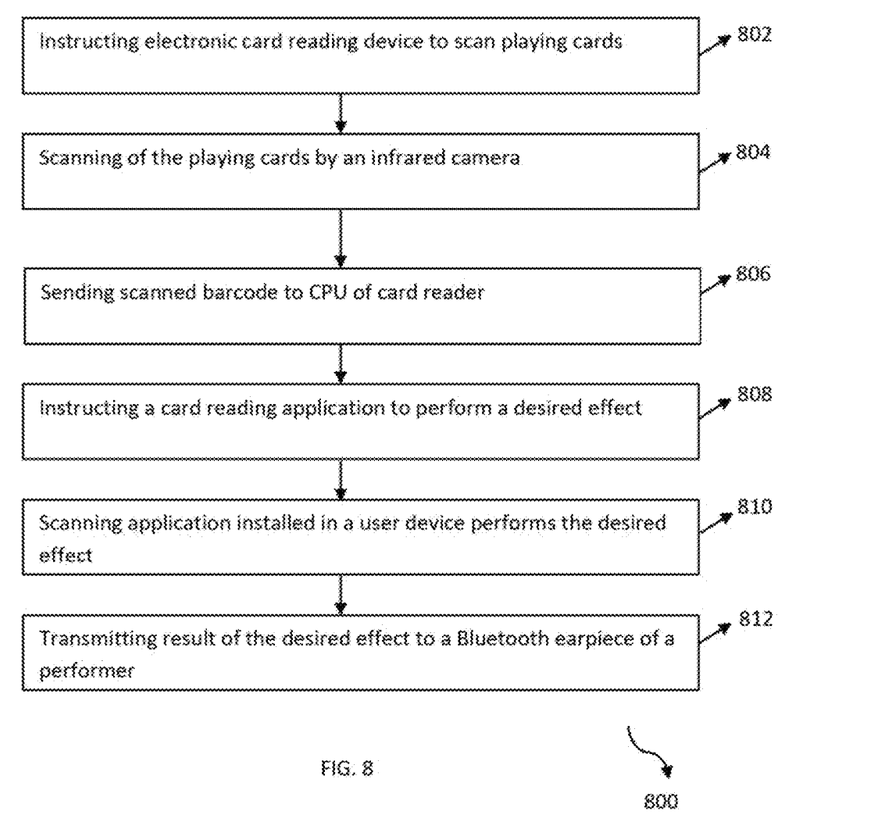
FIG. 8 illustrates a flowchart showing a method for scanning the playing cards in a deck using the card reader, in accordance with an embodiment of the present invention.

FIG. 8 illustrates a flowchart showing a method for scanning the playing cards in the deck using the electronic card reader, in accordance with an embodiment of the present invention. As shown in the method 800, a user instructs a card reader 104 to scan a plurality of playing cards in a deck using a user device 122, at a step 802. A user may be a magician or a performer. In an embodiment, the user device 122 is a mobile device, such as an I-Phone, an android phone, a tablet and the like. In another embodiment, the user device 122 is a computing device, such as a laptop, a desktop and the like. Further, the user device 122 is installed with a scanning application 130 that allows the user to control the functions of the card reader 104 and instruct it to start the scan.

At a step 804, after receiving the instruction of scanning, the card reader 104 employs the inbuilt IR camera 108 to scan and capture images/videos of the barcodes inscribed on the playing cards. The barcodes contain encoded information related to the playing cards that include and is not limited to the suit, value, color, orientation, and direction of the playing cards. Determining the characteristics of the playing cards, the card reader 104 is able to determine the sequence and order of the playing cards in the deck. Since, the barcodes are marked with an IR absorbent ink, therefore, the IR camera 108 is able to scan the IR absorbent barcodes.

At a step 806, the camera 108 sends the captured images/videos to CPU of the card reader for processing. The CPU 106 analyses and decodes the information contained in the barcode and determines the characteristics of the playing cards, by applying the scanning algorithms. In an embodiment, the camera 108 sends the captured images/videos of the barcodes to the scanning application 130 of the user device 122 for determining the characteristics of the playing cards.

At a step 808, the user instructs the scanning algorithm to perform a desired effect by selecting the effect from the application. The user is able to choose from a list of effects that can be performed by the card reader 104. The effects may include and not limited to Read all playing cards; Locate missing cards; Locate inserted cards; Locate rotated cards; Locate upside-down cards; Count cards; Name any card; and Locate any card at any number and the like.

At a step 810, after receiving the data related to the scanned barcodes, the scanning application 130 performs the selected effect in the received data. Thereafter, the result of the performed effect is transmitted to the user via the user device 122 and an earpiece 132.

Consequently and advantageously, the card reading system and method allows the user to scan the playing cards from any direction using the inbuilt IR camera 108 in the card reader 104 and a wireless remote camera 134. Further, the card reading system 100 marks the playing cards on their four edges, therefore, the card reader 104 is able to scan the playing cards even when they are stacked in the deck. Furthermore, the barcodes and any other encoded information are inscribed on the playing cards using the IR absorbent ink, which reveals encoded information only under IR radiation. Additionally, the system 100 includes barcode scanning and image processing techniques to successfully obtain encoded information of the playing cards. The system is able to scan and read the cards, whether they are stacked, faced up or down, spread in a ribbon on otherwise, or riffled.

The card reading system also includes controlling the card reader from a mobile based application, which allows the user with greater flexibility and options of magic tricks. Also, the user is able to control the card reader from a remote location, since the card reader can be controlled from a web based application too.

The invention claimed is:

1. An electronic card reading system for a magician or performer to scan playing cards in a deck comprising of:
   a plurality of playing cards marked on their edges, inscribed with a unique encoded information using an infrared absorbent ink, representing characteristics of the playing cards;
   a card reader comprising of:
   at least one inbuilt infrared camera for scanning and capturing images/videos of the encoded information from the edges of the playing cards; a central processing unit (CPU) receiving the images/videos of the encoded information from the infrared camera and decoding the encoded information to determine characteristics of the playing cards and sequence of the playing cards placed in the deck;
      a communicating module for communicating the decoded information representing the characteristics and sequence of the playing cards;
      a user device receiving the decoded information from the card reader, and communicating the decoded information to a user;
      a USB programming module configured for re-programming the card reader as well as charging a battery;
      a plurality of externally accessible micro-switches configured on a side and top of the card reader; and
      a proximity sensor;
      an additional wireless camera capable of being placed within a jacket, sleeves, or any preferred location by the performer or magician;
      wherein the CPU further performs one or more desired effects on the decoded information and the determined sequence of the playing cards, where the effects include and not limited to read all playing cards; locate missing cards; locate inserted cards; locate rotated cards; locate upside-down cards; count cards; name any card; and locate any card at any number, deal a suit, and poker demonstration; and wherein the user device is a mobile device with a communicating module to communicate the decoded information and result of the desired effect to an earpiece of the magician or performer;
      wherein the plurality of micro-switches are configured to allow the user to calibrate functions or perform a desired effects or results; and wherein the card reader is housed within a 3D printed case that fits within a standard size card case.

2. The card reading system as claimed in claim 1, wherein the marked playing cards may be stacked over one another in a deck, or spread in a fashion to reveal indexes, faces or rear of the playing cards.

3. The card reading system as claimed in claim 1, wherein the unique encoded information may be inscribed on the edges or face or rear of the playing cards.

4. The card reading system as claimed in claim 1, wherein the unique encoded information is in the form of barcode or OR code or any other two dimensional code.

5. The card reading system as claimed in claim 1, wherein the CPU employs a scanning algorithm to decode the encoded information of the playing cards to determine characteristics and sequence of the playing cards.

6. The card reading system as claimed in claim 1, wherein the characteristics of the playing cards include and do not limit to value, suit, color, orientation, and direction of the playing cards.

7. An electronic card reading system for a magician or performer to scan playing cards in a deck comprising:
   a plurality of playing cards marked on their edges and stacked over one another in the deck, inscribed with a unique encoded information on the edge of each playing card, the encoded information representing one or more characteristics of the playing cards and inscribed using infrared absorbent ink; and
   a card reader further comprising of:
   at least one inbuilt infrared camera for scanning and capturing images/videos of the encoded information from the edges of the playing cards; a central processing unit (CPU) receiving the images/videos of the encoded information from the one or more infrared camera and decoding the encoded information to determine the characteristics and sequence of the playing cards stacked in the deck;
   a communicating module for communicating the decoded information representing the characteristics and sequence of the playing cards;
   a user device including a communicating module, and an I/O module which is any of a keyboard, or a touch panel or a microphone to enter inputs from the user, and a display screen or a speaker to output results to the user; and
   a scanning application for analyzing the decoded information and the sequence of the playing cards and performing a desired effect on the decoded information and the sequence such as read all playing cards; locate missing cards; locate inserted cards; locate rotated cards; locate upside-down cards; count cards; name any card; locate any card at any number, deal a suit, and poker demonstration;
   wherein the scanning application allows the performer or magician to select from multiple functions including perform effect, configure effects, settings, stealth mode, calibrate deck, help; and
   wherein the communication module is configured to receive the decoded information and sequence from the card reader, to indicate or provide feedback to the user device if the card reader is functioning correctly or not, to report a battery status to the user device, to report a version of a software and requirement of update, and to communicate videos and images to the user device.

8. The card reading system as claimed in claim 7, wherein the unique encoded information is in the form of barcode.

9. The card reading system as claimed in claim 7, wherein the characteristics of the playing cards include and do not limit to value, suit, color, orientation, and direction of the playing cards.

10. The card reading system as claimed in claim 7, wherein the CPU employs a scanning algorithm to decode the encoded information of the playing cards to determine characteristics and sequence of the playing cards.

11. The card reading system as claimed in claim 7, wherein the user device is a mobile device, or a tablet.

12. The card reading system as claimed in claim 7, wherein the user device is a remotely located computing device, as a desktop, a laptop, a Macbook, and the remotely located computing device may have a web-based scanning application or an installed computer application and communicates with the card reader over a long range communication protocol, or Internet.

13. The card reading system as claimed in claim 7, wherein the card reader is housed in a case of playing cards, which may be a 3D printed card case.

14. The card reading system as claimed in claim 7 may also include a wireless remote camera transmitting an analogue video stream to the CPU, and potentially located on the user's jacket or in the user's sleeve, while the CPU receives scanned images/videos from both the inbuilt infrared camera and the wireless remote camera.

15. The card reading system as claimed in claim 7, wherein the unique encoded information becomes different for the playing cards when upside (face) down or if the card is rotated 180 degrees in the deck.

16. The card reading system as claimed in claim 14, wherein the wireless remote camera employs scanning of encoded information and image processing techniques, when the encoded information is inscribed on face or rear of the playing cards.

* * * * *